United States Patent
Zhao et al.

(10) Patent No.: US 10,497,137 B2
(45) Date of Patent: *Dec. 3, 2019

(54) TEMPERATURE COMPENSATION FOR STRUCTURED LIGHT DEPTH IMAGING SYSTEM

(71) Applicant: Microsoft Technology Licensing, LLC, Redmond, WA (US)

(72) Inventors: Jian Zhao, Kenmore, WA (US); Raymond Kirk Price, Redmond, WA (US); Michael Bleyer, Seattle, WA (US); Denis Demandolx, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/123,720

(22) Filed: Sep. 6, 2018

(65) Prior Publication Data

US 2019/0005664 A1 Jan. 3, 2019

Related U.S. Application Data

(63) Continuation of application No. 15/251,966, filed on Aug. 30, 2016, now Pat. No. 10,089,738.

(51) Int. Cl.
*G01B 11/22* (2006.01)
*G06T 7/50* (2017.01)
(Continued)

(52) U.S. Cl.
CPC ............ *G06T 7/50* (2017.01); *G01B 11/22* (2013.01); *G06K 9/52* (2013.01); *G06K 9/6201* (2013.01); *G06K 9/66* (2013.01); *G06T 5/006* (2013.01); *G06T 7/557* (2017.01); *G06T 7/60* (2013.01); *G06T 7/73* (2017.01); *H04N 5/2252* (2013.01); *H04N 13/20* (2018.05); *H04N 13/239* (2018.05); *H04N 13/254* (2018.05); *H04N 13/271* (2018.05); *G06T 2207/10012* (2013.01); *G06T 2207/10021* (2013.01);
(Continued)

(58) Field of Classification Search
CPC ....... G06T 7/0051; G06T 7/0042; G06T 7/60; G01B 11/22; H04N 5/2252; G06K 9/66; G06K 9/6201; G06K 9/52
See application file for complete search history.

(56) References Cited

U.S. PATENT DOCUMENTS

2013/0107220 A1* 5/2013 Furukawa ............ G03B 21/16
353/20
2017/0094255 A1* 3/2017 Zabatani .............. G06F 3/0488

* cited by examiner

*Primary Examiner* — Nam D Pham
(74) *Attorney, Agent, or Firm* — Arent Fox LLP

(57) ABSTRACT

Disclosed are an apparatus and a method of compensating temperature shifts of a structured light pattern for a depth imaging system. In some embodiments, a depth imaging device includes a light source, an imaging sensor and a processor. The light source emits light corresponding to a pattern. A temperature drift of the light source can cause a shift of the pattern. The imaging sensor receives the light reflected by environment in front of the depth imaging device and generates a depth map including a plurality of pixel values corresponding to depths of the environment relative to the depth imaging device. The processor estimates the shift of the pattern based on a polynomial model depending on the temperature drift of the light source. The processor further adjusts the depth map based on the shift of the pattern.

20 Claims, 8 Drawing Sheets

(51) Int. Cl.
  *G06K 9/52* (2006.01)
  *G06K 9/62* (2006.01)
  *G06T 7/60* (2017.01)
  *G06K 9/66* (2006.01)
  *H04N 5/225* (2006.01)
  *G06T 5/00* (2006.01)
  *H04N 13/254* (2018.01)
  *H04N 13/271* (2018.01)
  *H04N 13/239* (2018.01)
  *G06T 7/73* (2017.01)
  *G06T 7/557* (2017.01)
  *H04N 13/20* (2018.01)

(52) U.S. Cl.
  CPC ............... *G06T 2207/10028* (2013.01); *G06T 2207/20076* (2013.01); *G06T 2207/20081* (2013.01)

TEMPERATURE COMPENSATION FOR STRUCTURED LIGHT DEPTH IMAGING SYSTEM

CROSS-REFERENCE TO RELATED APPLICATION(S)

This application claims the benefit of U.S. Non-Provisional application Ser. No. 15/251,966, entitled "Temperature Compensation for Structured Light Depth Imaging System" and filed on Aug. 30, 2016, which is expressly incorporated by reference herein in its entirety.

BACKGROUND

Depth sensing technology can be used to determine a person's location in relation to nearby objects or to generate an image of a person's immediate environment in three dimensions (3D). One application in which depth sensing technology may be used is in head-mounted display (HMD) devices and other types of near-eye display (NED) devices. Depth sensing technology can employ a stereo vision, time-of-flight (ToF) or structured light depth camera. Such a device can create a map of physical surfaces in the user's environment (called a depth image or depth map) and, if desired, to render a 3D image of the user's environment.

A depth sensing system (also referred to as depth imaging system) can include a light source for providing structured light. Structured light is a process of projecting a known pattern of light onto a scene. The light is reflected by the scene and captured by a depth sensing camera ( ). The light pattern captured by the depth sensing camera is different from the original known pattern because of the reflection by the scene, that is, the light pattern captured by the imaging camera is "deformed." Based on the differences between the deformed pattern and the known original pattern, the depth sensing system can calculate the depth information of the scene. However, the light pattern being captured can be further deformed due to factors other than the scene. For example, a temperature drift of a light source can cause a shift of the light pattern. Such a shift of the light pattern tends to cause systematic bias of the calculated depth information of the scene.

SUMMARY

Introduced here are at least one apparatus and at least one method (collectively and individually, "the technique introduced here") for compensating for temperature shifts of a structured light pattern of a depth imaging system. In some embodiments, a depth imaging device includes a light source, an imaging sensor and a processor. The light source emits light corresponding to a pattern. A temperature drift of the light source can cause a shift of the illumination dot pattern. The imaging sensor receives the light reflected by environment in front of the depth imaging device and generates a depth map including a plurality of pixel values corresponding to depths of the environment relative to the depth imaging device. The processor estimates the shift of the pattern based on a polynomial model depending on the temperature drift of the light source. The processor further adjusts the depth map based on the shift of the pattern.

In certain embodiments, the polynomial model can be a global model that includes a first polynomial to predict shifts in a first direction and a second polynomial to predict shifts in a second direction. Each of the first and second polynomials includes a plurality of cubic terms. Each of the cubic terms includes a product of multiplying three variables that include a temperature drift from a reference temperature, a x-coordinate in a reference image corresponding to the pattern, or a y-coordinate in the reference image.

In certain embodiments, the polynomial model can be an individual regression model. The individual regression model includes a plurality of polynomial sets. Each of the polynomial sets predicts a shift of one of the objects of the pattern due to temperature drift. Each of the polynomial sets including a polynomial to estimate a shift along a first direction and another polynomial to estimate a shift along a second direction.

Other aspects of the disclosed embodiments will be apparent from the accompanying figures and detailed description.

This Summary is provided to introduce a selection of concepts in a simplified form that are further explained below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Figure 1:
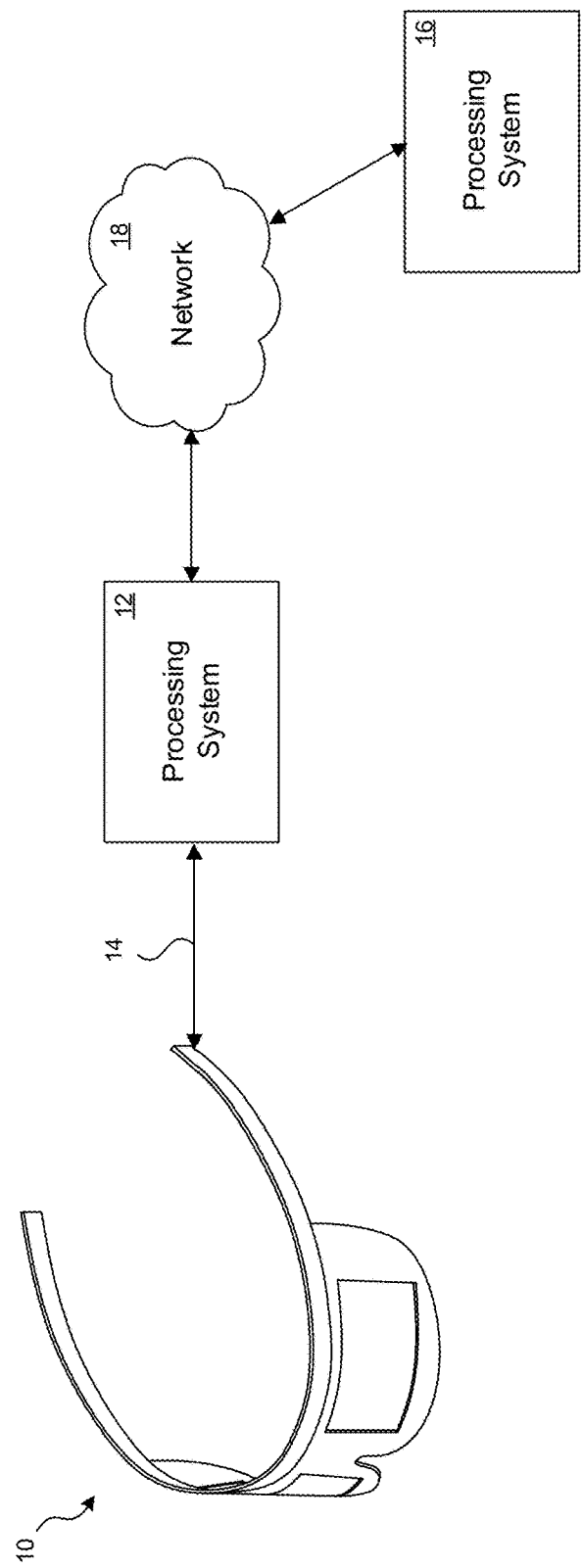
FIG. 1 shows an example of an environment in which a virtual reality (VR) or augmented reality (AR) enabled head-mounted display device (hereinafter "HMD device") can be used.

In this description, references to "an embodiment," "one embodiment" or the like mean that the particular feature, function, structure or characteristic being described is included in at least one embodiment introduced here. Occurrences of such phrases in this specification do not necessarily all refer to the same embodiment. On the other hand, the embodiments referred to also are not necessarily mutually exclusive.

The following description generally assumes that a "user" of a display device is a human. Note, however, that a display device of the disclosed embodiments can potentially be used by a user that is not human, such as a machine or an animal. Hence, the term "user" can refer to any of those possibilities, except as may be otherwise stated or evident from the context. Further, the term "optical receptor" is used here as a general term to refer to a human eye, an animal eye, or a machine-implemented optical sensor designed to detect an image in a manner analogous to a human eye.

Virtual reality (VR) or augmented reality (AR) enabled head-mounted display (HMD) devices and other near-to-eye display systems may include transparent display elements that enable users to see concurrently both the real world around them and AR content displayed by the HMD devices. An HMD device may include components such as light-emission elements (e.g., light emitting diodes (LEDs)), waveguides, various types of sensors, and processing electronics. HMD devices may further include one or more imager devices to generate images (e.g., stereo pair images for 3D vision) in accordance with the environment of a user wearing the HMD device, based on measurements and calculations determined from the components included in the HMD device.

An HMD device may also include a depth imaging system (also referred to as depth sensing system or depth imaging device) that resolves distance between the HMD device worn by a user and physical surfaces of objects in the user's immediate vicinity (e.g., walls, furniture, people and other objects). The depth imaging system may include a structured light or ToF camera that is used to produce a 3D image of the scene. The captured image has pixel values corresponding to the distance between the HMD device and points of the scene.

The HMD device may include an imaging device that generates holographic content based on the scanned 3d scene, and that can resolve distances, for example, so that holographic objects appear at specific locations relative to physical objects in the user's environment. 3D imaging systems can also be used for object segmentation, gesture recognition, and spatial mapping. The HMD device may also have one or more display devices to display the generated images overlaid on the field of view of an optical receptor of a user when the HMD device is worn by the user. Specifically, one or more transparent waveguides of the HMD device can be arranged so that they are positioned to be located directly in front of each eye of the user when the HMD device is worn by the user, to emit light representing the generated images into the eyes of the user. With such a configuration, images generated by the HMD device can be overlaid on the user's three-dimensional view of the real world.

FIGS. 1 through 8 and related text describe certain embodiments of an illumination module in the context of near-to-eye display systems. However, the disclosed embodiments are not limited to near-to-eye display systems and have a variety of possible applications, including any active illumination systems (i.e., actively using light sources) such as used in active light projection systems or any active camera modules. All such applications, improvements, or modifications are considered within the scope of the concepts disclosed here.

FIG. 1 schematically shows an example of an environment in which an HMD device can be used. In the illustrated example, the HMD device 10 is configured to communicate data to and from an external processing system 12 through a connection 14, which can be a wired connection, a wireless connection, or a combination thereof. In other use cases, however, the HMD device 10 may operate as a standalone device. The connection 14 can be configured to carry any kind of data, such as image data (e.g., still images and/or full-motion video, including 2D and 3D images), audio, multimedia, voice, and/or any other type(s) of data. The processing system 12 may be, for example, a game console, personal computer, tablet computer, smartphone, or other type of processing device. The connection 14 can be, for example, a universal serial bus (USB) connection, Wi-Fi connection, Bluetooth or Bluetooth Low Energy (BLE) connection, Ethernet connection, cable connection, digital subscriber line (DSL) connection, cellular connection (e.g., 3G, LTE/4G or 5G), or the like, or a combination thereof. Additionally, the processing system 12 may communicate with one or more other processing systems 16 via a network 18, which may be or include, for example, a local area network (LAN), a wide area network (WAN), an intranet, a metropolitan area network (MAN), the global Internet, or combinations thereof.

Figure 2:
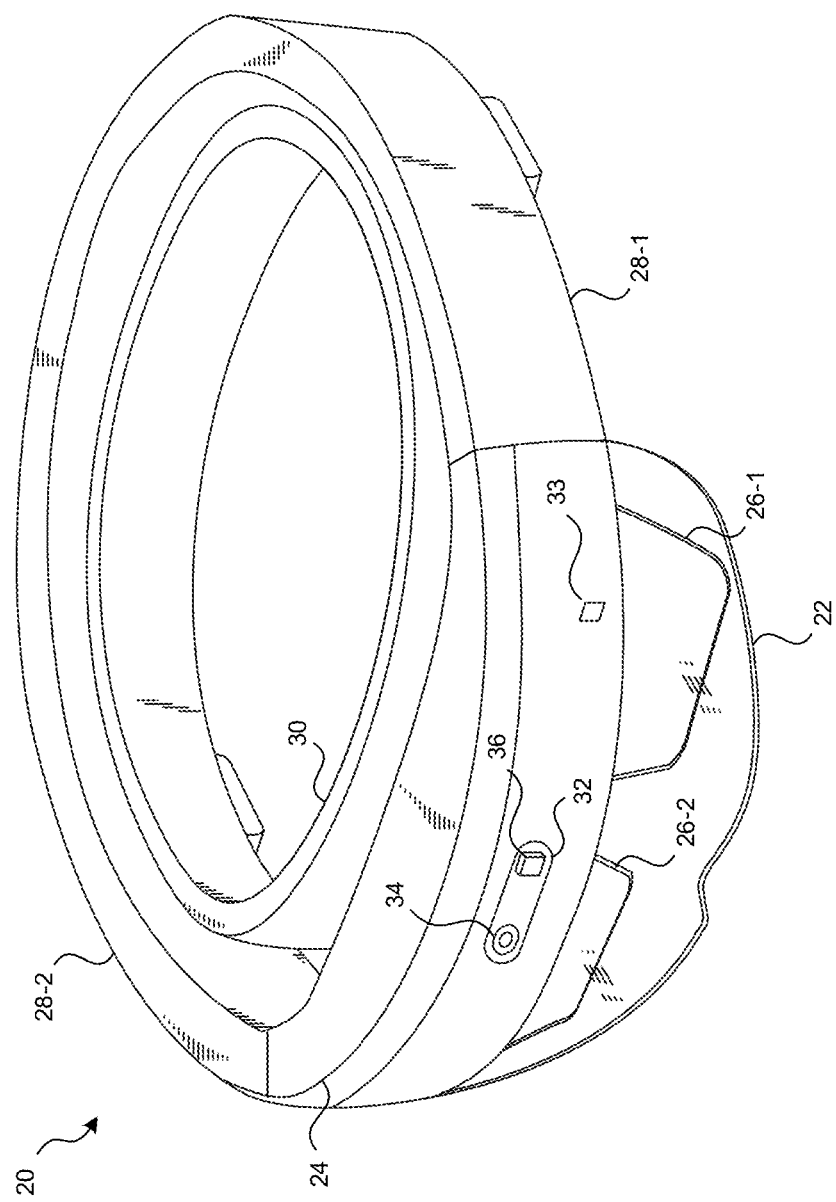
FIG. 2 illustrates a perspective view of an example of an HMD device.

FIG. 2 shows a perspective view of an HMD device 20 that can incorporate the features being introduced here, according to certain embodiments. The HMD device 20 can be an embodiment of the HMD device 10 of FIG. 1. The HMD device 20 has a protective sealed visor assembly 22 (hereafter the "visor assembly 22") that includes a chassis 24. The chassis 24 is the structural component by which display elements, optics, sensors and electronics are coupled to the rest of the HMD device 20. The chassis 24 can be formed of molded plastic, lightweight metal alloy, or polymer, for example.

The visor assembly 22 includes left and right AR displays 26-1 and 26-2, respectively. The AR displays 26-1 and 26-2 are configured to display images overlaid on the user's view of the real-world environment, for example, by projecting light into the user's eyes. Left and right side arms 28-1 and 28-2, respectively, are structures that attach to the chassis 24 at the left and right open ends of the chassis 24, respectively, via flexible or rigid fastening mechanisms (including one or more clamps, hinges, etc.). The HMD device 20 includes an adjustable headband (or other type of head fitting) 30, attached to the side arms 28-1 and 28-2, by which the HMD device 20 can be worn on the user's head.

The chassis 24 may include various fixtures (e.g., screw holes, raised flat surfaces, etc.) to which a sensor assembly 32 and other components can be attached. In some embodiments the sensor assembly 32 is contained within the visor assembly 22 and mounted to an interior surface of the chassis 24 via a lightweight metal frame (not shown). A circuit board (not shown in FIG. 2) bearing electronics components of the HMD 20 (e.g., microprocessor, memory) can also be mounted to the chassis 24 within the visor assembly 22.

The sensor assembly 32 includes a depth camera 34 and an illumination module 36 of a depth imaging system. The illumination module 36 emits light to illuminate a scene. Some of the light reflects off surfaces of objects in the scene, and returns back to the imaging camera 34. In some embodiments such as an active stereo system, the assembly can include two or more cameras. The depth camera 34 captures the reflected light that includes at least a portion of the light from the illumination module 36.

The "light" emitted from the illumination module 36 is electromagnetic radiation suitable for depth sensing and should not directly interfere with the user's view of the real world. As such, the light emitted from the illumination module 36 is typically not part of the human-visible spectrum. Examples of the emitted light include infrared (IR) light to make the illumination unobtrusive. Sources of the light emitted by the illumination module 36 may include LEDs such as super-luminescent LEDs, laser diodes, or any other semiconductor-based light source with sufficient power output.

The depth camera 34 may be or include any image sensor configured to capture light emitted by an illumination module 36. The depth camera 34 may include a lens that gathers reflected light and images the environment onto the image sensor. An optical bandpass filter may be used to pass only the light with the same wavelength as the light emitted by the illumination module 36. For example, in a structured light depth imaging system, each pixel of the depth camera 34 may use triangulation to determine the distance to objects in the scene. Any of various approaches known to persons skilled in the art can be used for determining the corresponding depth calculations.

The HMD device 20 includes electronics circuitry (not shown in FIG. 2) to control the operations of the depth camera 34 and the illumination module 36, and to perform associated data processing functions. The circuitry may include, for example, one or more processors and one or more memories. As a result, the HMD device 20 can provide surface reconstruction to model the user's environment, or be used as a sensor to receive human interaction information. With such a configuration, images generated by the HMD device 20 can be properly overlaid on the user's 3D view of the real world to provide a so-called augmented reality. Note that in other embodiments the aforementioned components may be located in different locations on the HMD device 20. Additionally, some embodiments may omit some of the aforementioned components and/or may include additional components not discussed above nor shown in FIG. 2. In some alternative embodiments, the aforementioned depth imaging system can be included in devices that are not HMD devices. For example, depth imaging systems can be used in motion sensing input devices for computers or game consoles, automotive sensing devices, earth topography detectors, robots, etc.

The HMD device 20 can also include a temperature sensor 33. The temperature sensor can detect a temperature drift of, e.g., the depth camera 23, the illumination module 36, another optical component of the HMD device 20, or an environment of the HMD device 20.

Figure 3:
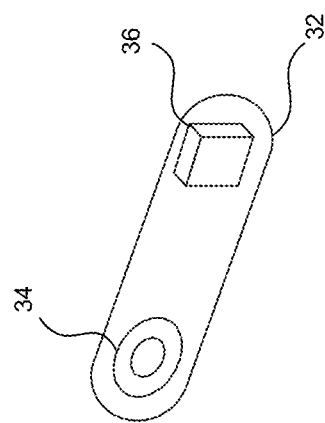
FIG. 3 shows a portion of a sensor assembly of an HMD device including a depth camera and an illumination module.

FIG. 3 shows a portion of the sensor assembly 32 of the HMD device 20. In particular, the sensor assembly 32 includes sensors and electronics mounted to a circuit board, which can be mounted to the chassis 24 as mentioned above. The sensors mounted to the circuit board include the depth camera 34 and the illumination module 36. Other sensors that may be included in the sensor assembly 32 but are not shown in the figures or discussed further may include head-tracking cameras, visible spectrum cameras, ambient light sensors, and the like. Some or all of these other sensors may also be mounted to the sensor assembly 32.

The locations and positions of the illumination module 36 and the depth camera 34 relative to each other as shown in FIG. 3 are merely examples of a configuration used for depth sensing; other configurations are possible in the context of the technique introduced here.

Shift of Structured Light Pattern Due to Temperature Variation

Figure 4:
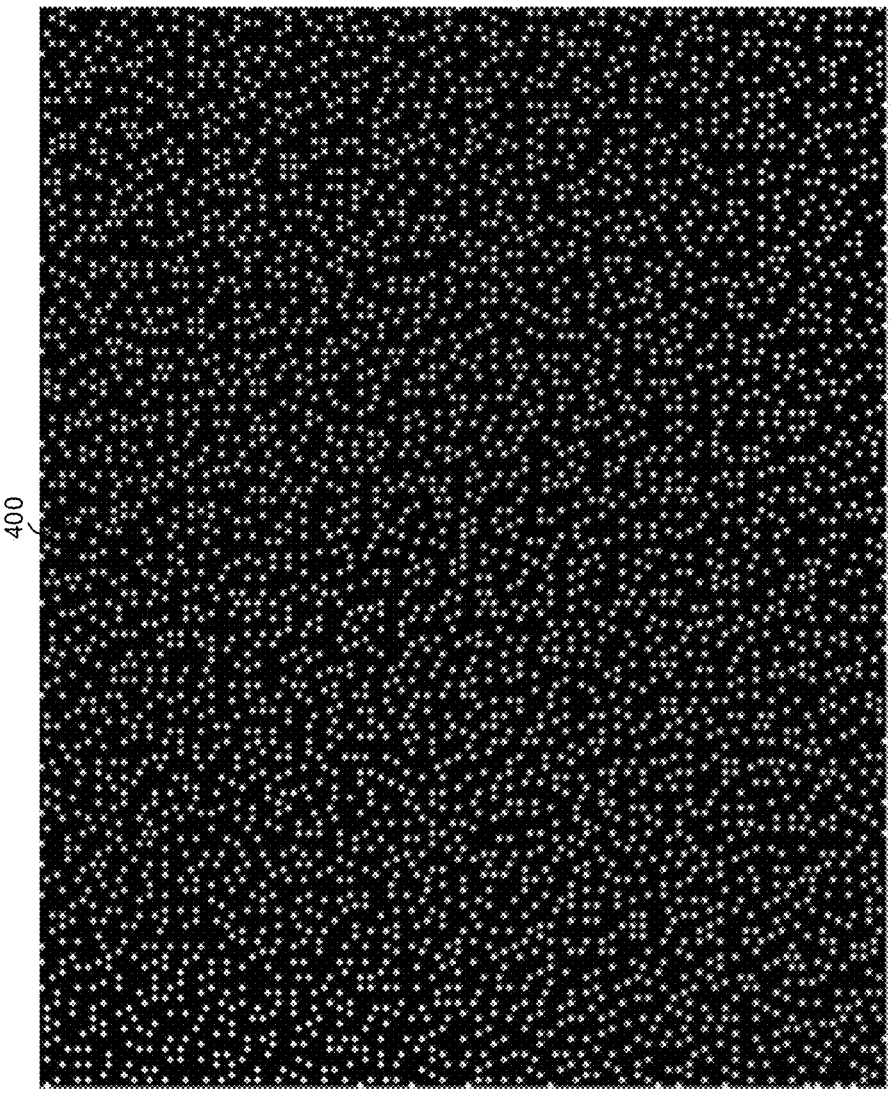
FIG. 4 shows a speckle pattern as an example of a structured light pattern that can be produced in a structured light process.

A depth imaging system can include a light source for providing structured light for projecting a known pattern of light onto a scene. For example, a laser illumination source, as illustrated in FIG. 3, can operate as the light source for providing the structured light. FIG. 4 shows a dot pattern as an example of a structured light pattern that can be produced in a structured light depth evaluation. The speckle pattern 400 (also referred to as dot pattern or pattern of dots) can be generated by, e.g., diffractive optical elements (DOEs). When the environment reflects the light, the pattern illuminated by the structured light source is deformed before the pattern being captured by the depth camera. The depth imaging system can calculate the depths of surfaces and the environment, relative to the imaging system, based on the displacements of the dots in the pattern 400, from the original known speckle pattern 400 to a deformed pattern captured by the depth camera.

However, the speckle pattern may also drift due to temperature variation of the laser illuminator. In particular, the wavelength of the light source (e.g. laser diode) used for illumination may be sensitive to changes in the semiconductor junction temperature. For example, if an illumination power of the light source changes, the junction temperature will shift. In turn, the wavelength of the light source will also shift. For example, a wavelength shift for a 850 nm laser diode due to a temperature drift is approximately 0.3 nm/° C.

Figure 5:
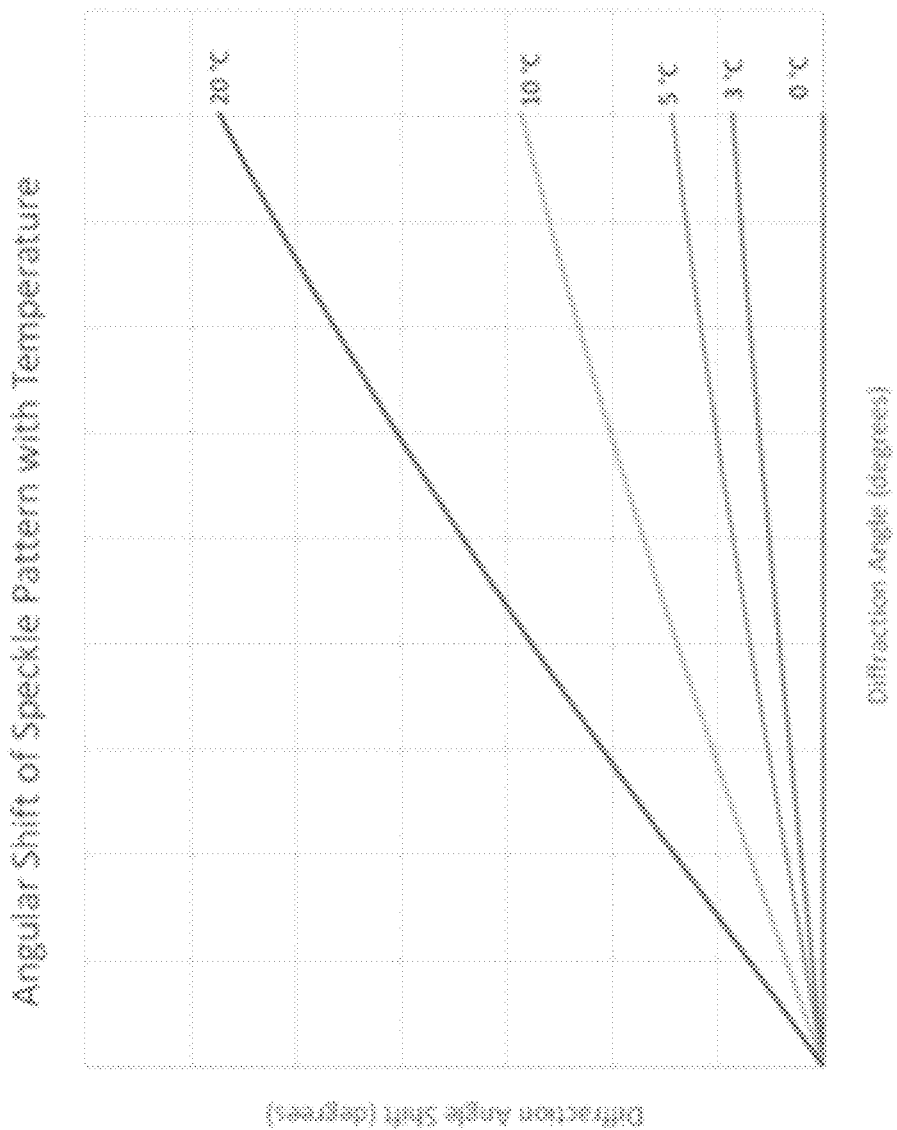
FIG. 5 illustrates shifts in diffraction angle shift with temperature for a structured light illuminator.

The shift of the light wavelength causes shifting of dots in the speckle pattern. For example, for a speckle pattern generated by a holographic diffraction grating, the diffraction angle is $$\theta m = \arcsin\left(\frac{m\lambda}{d}\right);$$

where $\lambda$ is the wavelength of the illumination, and d is the grating pitch, m is the diffraction order of the light diffracted from the diffraction grating. As the function of the diffraction angle shows, light of higher diffraction orders experience greater shifts with the laser wavelength, which is influenced by the device temperature. FIG. 5 illustrates shifts in diffraction angles for a sample structured light system. The sample structured light system includes, e.g., a structure light source with an illumination wavelength of 850 nm and a diffraction grating with a grating dimension of 120 um.

Such drift of the speckle pattern due to temperature variation, especially if occurring in the horizontal direction (relative to the camera orientation), tends to cause systematic bias of the captured depth information. Furthermore, significant drift in the vertical direction can cause conventional scanline searching algorithms for generating depth maps to fail.

Some conventional systems try to avoid temperature variation by stabilizing the laser diode temperature by using thermoelectric coolers (TECs). However, the additional size and power consumption of the TECs makes such a solution unacceptable for many applications, such as mobile electronic devices (e.g., HMDs).

According to the technique introduced here, therefore, a structured light depth imaging system can use a temperature compensation model to enable the system to perform accurately in different ambient temperature environments, without the need for expensive per-device calibration or bulky and power-hungry TECs. For applying the temperature compensation model, the system collects dot pattern images for different ambient temperature, applies a regression model for each dot position, and recovers a reference view of the pattern for any given ambient temperature before applying stereo searching algorithm for calculating depth information. The temperature compensation model can be, e.g., a polynomial model. Two examples of the temperature compensation polynomial model are disclosed here: a global model and an individual regression model.

Although various embodiments discloses a structured light source projecting a speckle pattern including a plurality of dots as an example, any of various known or convenient patterns could be used as the pattern for structured light. For example, the technology disclosed here can be applied to a pattern including objects with different shapes.

Global Model

The structured light depth imaging system can apply a global model to estimate shift of structured light pattern due to temperature variation (such a shift is also referred to as temperature shift). The global model uses a set of polynomials for modelling temperature shifts of all features in the structured light pattern. For example, the global model can use two polynomials to model, respectively, horizontal shift and vertical shifts of dots in the structured light pattern. Each polynomial depends on, e.g., coordinates of the individual dot in the original known pattern (also referred to as original reference image) and a temperature drift between a current temperature and a reference temperature. The global model may omit effects of local device variation and geometric lens distortion, but is still efficient enough for a further line prediction process to calculate the depth information.

In one embodiment, the polynomial for modeling horizontal shift of the individual dot can be:

$$x'=a_1t^3+a_2tx^2+a_3ty^2+a_4txy+a_5t^2x+a_6t^2y+a_7tx+a_8ty+a_9t^2+a_{10}t+x. \quad (1)$$

Similarly, the polynomial for modeling vertical shift of the individual dot can be:

$$y'=b_1t^3+b_2tx^2+b_3ty^2+b_4txy+b_5t^2x+b_6t^2y+b_7tx+b_8ty+b_9t^2+b_{10}t+y. \quad (2)$$

Coordinates x and y are the positional coordinates of the dots in the dot pattern in the original reference image; x' and y' are the positional coordinates of the dots in the dot pattern after the temperature drift (also referred to as temperature-shifted coordinates); and t is the temperature drift between a current temperature and a reference temperature. The current temperature can be measured by, e.g., a temperature sensor on the device. The weight coefficients for the weighted linear combination ($a_l, b_l$ l=1 ... 10) are model parameters (also referred to as weight coefficients). The polynomials (1) and (2) of the global model include cubic terms (e.g., $a_1t^3, a_2tx^2, a_3ty^2, a_4txy, a_5t^2x, a_6t^2y$) to model the interaction between coordinates x and y and temperature drift t. Each cubic term includes a product of multiplying three variables; the variables can include, e.g., coordinate x, coordinate y or temperature drift t.

A training algorithm, e.g., a linear regression algorithm (also referred to as a linear regression process), can be used to estimate the model parameters ($a_l, b_l$ l=1 ... 10), by feeding known observations (x, y, t) and known response variables (x', y') and minimizing a difference between the calculate temperature-shifted coordinates and the fed known response coordinates. In other words, the cost function to be minimized during training is indicative of the difference between the calculate temperature-shifted coordinates and the known response coordinates.

Alternatively, a training algorithm can minimize the difference between a known depth map and a calculated depth map. For example, to determine the model parameters ($a_l, b_l$ l=1 ... 10), the polynomials (1) and (2) of the global model can be trained using the dot pattern in the original reference images, and shifted dot patterns in calibration reference images with different temperature drifts. The shifted dot patterns in calibration reference images are reflected by a calibration environment. The depth map of the calibration environment is known prior to the training. (For instance, the calibration environment can be a flat surface). Because the depth map is known, the model can adjust the model parameters during training so that the model predicts a shift of dot pattern due to temperature variation that leads to the known depth map. In other words, the model parameters are optimized during training to minimize a cost function. The cost function is indicative of a difference between the known depth map and a calculated depth map. The calculated depth map is calculated based on a temperature-shift of dot pattern due to temperature variation predicted by the model.

In some embodiments, the polynomials of the model can include terms using other variables. For example, some polynomial terms can include an angle between the light ray of each dot and an optical center of the depth imaging system. The model also can user a polar coordinate system to replace the Cartesian coordinate system.

In some embodiments, the polynomials of the model can include terms of orders higher than three in polynomials (1) and (2). For example, some polynomial terms can be quartic terms (order of 4), which include product of multiplying four variables. The terms of higher orders can model more complex interactions between x, y and t.

In some embodiments, the polynomials of the model can just include terms of orders less than 3. The polynomials with quadratic terms (order of 2) use less computing power to calculate and are suitable for situations where the interactions between x, y and t are not complex. The polynomials with quadratic terms can be, e.g.: $x'=a_1tx+a_2ty+a_3t^2+a_4t+x$; $y'=b_1tx+b_2ty+b_3t^2+b_4t+y$.

Individual Regression Model

The global model does not capture the variation of shifts for each individual dot, and also does not model dots that are local outliers and that do not follow the global model. Alternatively, therefore, an individual regression model can include polynomials for modeling temperature shifts for each individual dot:

$$x_i'=a_{1i}t^2+b_{1i}xt+c_{1i}yt+d_{1i}t+x; \quad (3)$$

$$y_i'=a_{2i}t^2+b_{2i}xt+c_{2i}yt+d_{2i}t+y; \quad (4)$$

wherein i is the index number of an individual dot among the dots of the pattern.

The polynomials (3) and (4) of the individual regression model can use quadratic terms that use less computing power than terms of higher orders. As a result, the polynomials (3) and (4) of the individual regression model can include a total of 10n model parameters (where n is the number of dots). In contrast, the global model can include fewer model parameters. For example, one embodiment of the global model using the polynomials (1) and (2) includes 20 model parameters.

In some embodiments, to reduce the memory usage due to the 10n model parameters, the individual regression model can exploit the spatial consistency between dots in proximity and subsample the parameter space. In other words, the individual regression model can include only polynomials for modeling temperature shifts for a subset of the selected dots in the structured light pattern. For the remaining dots, the temperature shifts can be predicted using polynomials of a neighbor selected dot, because generally dots in proximity have consistent temperature shifts.

Figure 6:
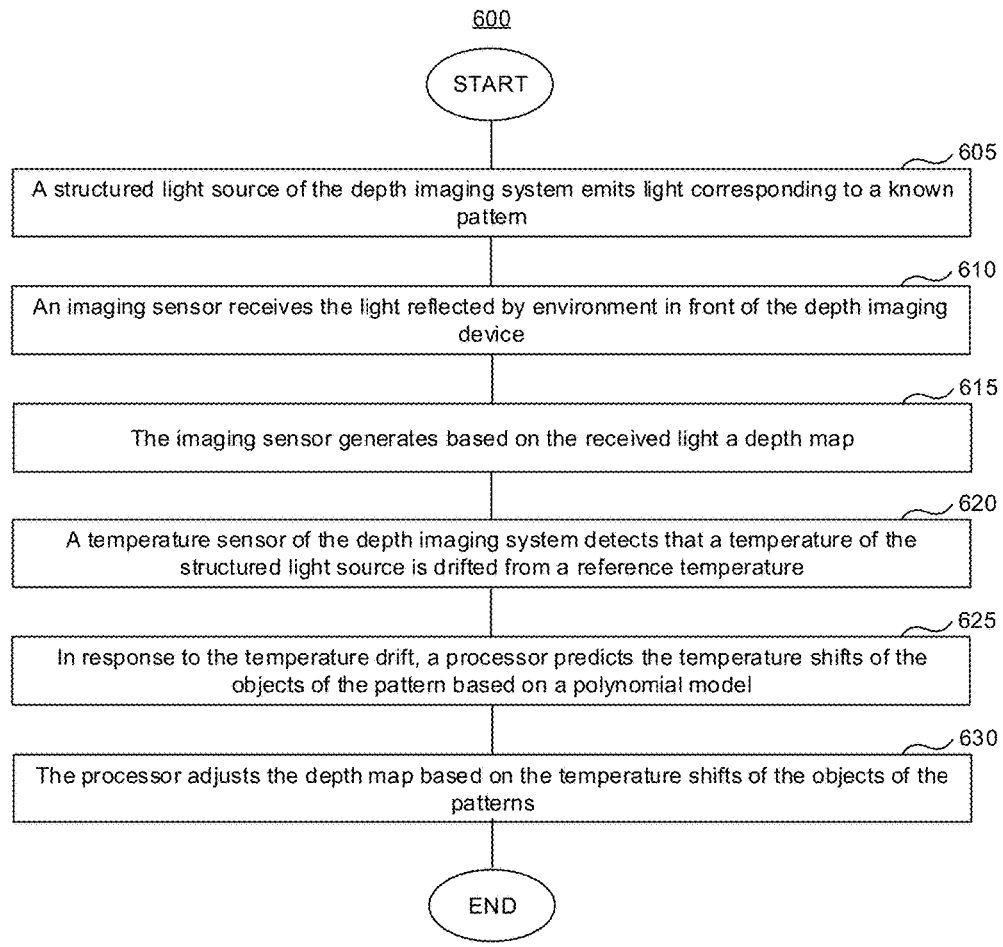
FIG. 6 illustrates an example of a process of compensating temperature shifts of a structured light pattern for a depth imaging system.

FIG. 6 illustrates an example of a process 600 of compensating temperature shifts of a structured light pattern for a depth imaging system. In step 605 of the process 600, a structured light source of the depth imaging system emits light corresponding to a known pattern. The known pattern can include a plurality of objects (e.g. dots). In step 610, an imaging sensor receives the light reflected by environment in the field of view of the of the depth imaging device. In step 615, the imaging sensor generates an image based on the received light a depth map. The depth map includes a plurality of pixel values corresponding to depths of the environment relative to the depth imaging device. In step 620, a temperature sensor of the depth imaging system detects that a temperature of the structured light source has drifted from a reference temperature. In step 625, in response to the temperature drift, a processor predicts the temperature shifts of the objects of the pattern based on a polynomial model. Such a polynomial model can be, e.g., the global model or the individual regression model disclosed here. In step 630, the processor adjusts the depth map based on the temperature shifts of the objects of the patterns.

In some embodiments, the system can adjust the depth map by combining the global model and the individual regression model. For example, in one embodiment, the system can use the individual regression model to predict temperature shifts of a subset of key dots of the pattern, and use the global model to predict temperature shifts of the remaining dots. Alternatively, the system can use both the global model and the individual regression model to predict two sets of temperature shifts of the dots. The system can then determine the temperature shifts using the two sets of predicted results. For example, the system may determine the temperature shifts of the dots by averaging the values of the two sets of temperature shifts.

The system can detect a distorted depth map if both the conditions of step 530 and step 960 are satisfied. In another embodiment, the system can detect a distorted depth map if either of the conditions of step 530 and step 960 is satisfied.

In some embodiments, the global model or the individual regression model can use functions other than polynomials. For example, the functions can include terms with exponents that are not positive integers.

Temperature Interpolation Model

Alternatively, or additionally, the temperature-shifted coordinates can be estimated based on interpolation. The temperature interpolation model can set up a plurality of key temperatures T=[$t_1$ ..., $t_m$], where m is the number of key temperatures. For each key temperature T, a set of temperature-shifted coordinates (x', y') or ($x_i'$, $y_i'$) environment are recorded. For a temperature t that is not a key temperature, the model identifies two nearest neighbor key temperatures that are respectively above and below the temperature t. The temperature-shifted coordinates for temperature t are the linear interpolations between the corresponding temperature-shifted coordinates for the two nearest neighbor key temperatures. In some other embodiments, splines or polynomials can be used for interpolation, instead of a linear interpolation.

In some alternative embodiments, for temperature-shifts that are not smooth enough to be described by the disclosed models, a per-dot lookup table can be generated. For each dot with coordinates x, y and temperature t, the lookup table stores the temperature-shifted coordinates x', y'.

Figure 7:
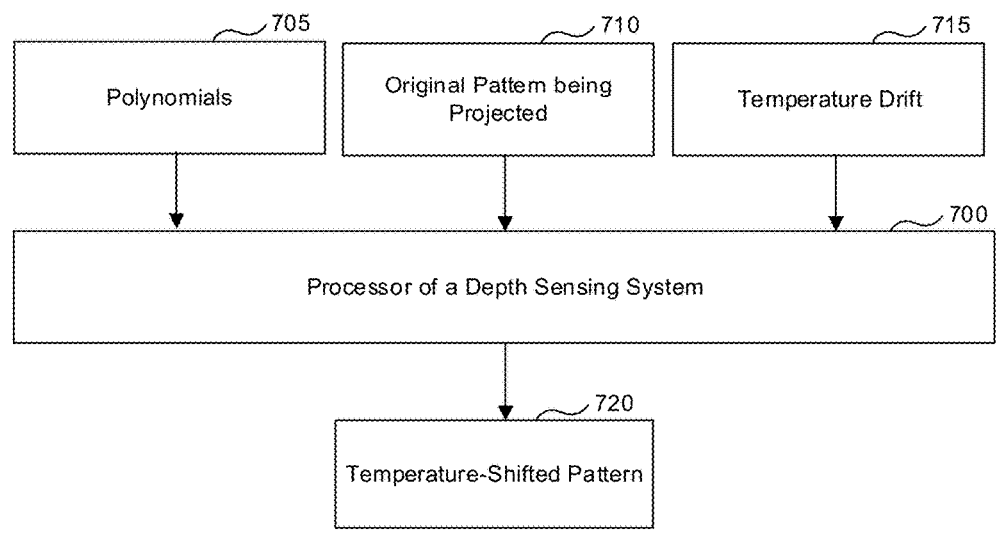
FIG. 7 illustrates an example of a processor for generating compensated shifts of a structured light pattern.

FIG. 7 illustrates an example of a processor for generating compensated shifts of a structured light pattern. To predict the temperature shift, the processor 700 of a depth sensing system receives the polynomials as inputs. The polynomials can be, e.g., the polynomials (1) and (2) of the global model or the polynomials (3) and (4) of the individual regression model. The received inputs include the trained model parameters. The processor 700 further receives the temperature drift 715 and the original pattern being projected 710 as inputs. The temperature drift 715 can a drift of temperature of the light source of the system, a drift of temperature of an optical component of the system, or a drift of temperature of an environment where the system is located. The information of the original pattern 710 can include positional coordinates of features on the pattern 710. The processor 700 uses the inputs to predict a temperature-shifted pattern 720. The information of the temperature-shifted pattern 720 can include shifted positional coordinates of the pattern features. Furthermore, using the temperature-shifted pattern 720, the processor 700 can adjust the depth map using a process illustrated in FIG. 6.

Figure 8:
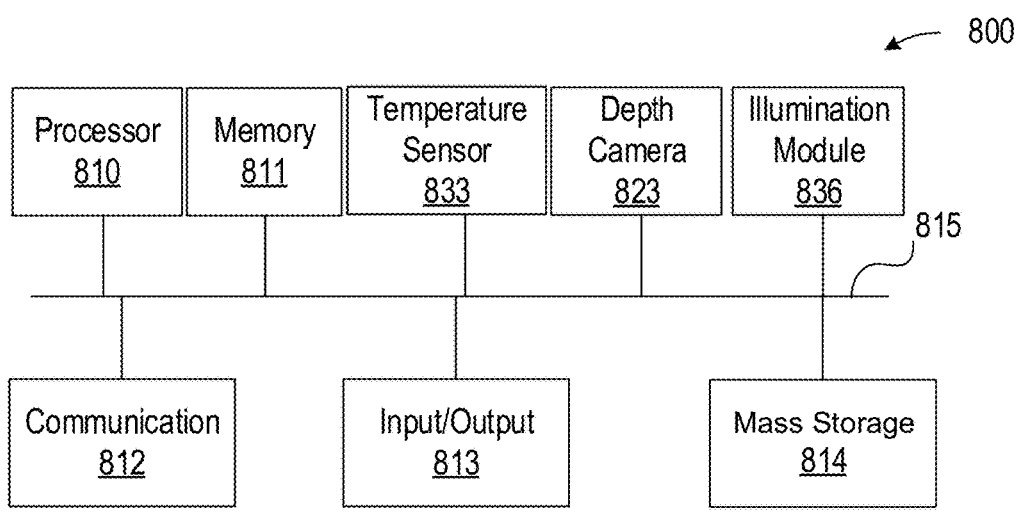
FIG. 8 shows a high-level example of a hardware architecture of a system that can be used to implement any one or more of the functional components described herein.

FIG. 8 shows a high-level example of a hardware architecture of a processing system that can be used to implement to perform the disclosed functions (e.g., steps of the process 600). The processing system illustrated in FIG. 8 can be part of an NED device. One or multiple instances of an architecture such as shown in FIG. 8 (e.g., multiple computers) can be used to implement the techniques described herein, where multiple such instances can be coupled to each other via one or more networks.

The NED device 800 includes a depth camera 823 and an illumination module 836, similar to the HMD device 20 as illustrated in FIG. 2. The NED device 800 can also include a temperature sensor 833. The temperature sensor 833 can detect a temperature drift of, e.g., a depth camera, a light source, an optical component of the NED device 800, or an environment of the NED device 800.

The illustrated processing system 800 includes one or more processors 810, one or more memories 811, one or more communication device(s) 812, one or more input/output (I/O) devices 813, and one or more mass storage devices 814, all coupled to each other through an interconnect 815. The interconnect 815 may be or include one or more conductive traces, buses, point-to-point connections, controllers, adapters and/or other conventional connection devices. Each processor 810 controls, at least in part, the overall operation of the processing device 800 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Each memory 811 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 814 can be or include one or more hard drives, digital versatile disks (DVDs), flash memories, or the like. Each memory 811 and/or mass storage 814 can store (individually or collectively) data and instructions that configure the processor(s) 810 to execute operations to implement the techniques described above. Each communication device 812 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing system 800, each I/O device 813 can be or include a device such as a display (which may be a touch screen display), audio speaker, keyboard, mouse or other pointing device, microphone, camera, etc. Note, however, that such I/O devices may be unnecessary if the processing device 800 is embodied solely as a server computer.

In the case of a user device, a communication device 812 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, a communication device 812 can be or include, for example, any of the aforementioned types of communication devices, a wired Ethernet adapter, cable modem, DSL modem, or the like, or a combination of such devices.

The machine-implemented operations described above can be implemented at least partially by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the embodiments introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

EXAMPLES OF CERTAIN EMBODIMENTS

Certain embodiments of the technology introduced herein are summarized in the following numbered examples:

1. A depth imaging device including: a light source to emit light corresponding to a predetermined pattern; an imaging sensor to receive the light reflected by the environment of the depth imaging device and that, when in operation, generates a depth map including a plurality of pixel values corresponding to depths of the environment relative to the imaging device; and a processor that, when in operation, estimates a shift of the pattern by using a polynomial model depending on the temperature drift of the light source and adjusts the depth map based on the shift of the pattern.

2. The device of example 1, wherein a temperature drift of the light source, an optical component of the depth imaging device, or an environment of the depth imaging device causes a shift of the pattern.

3. The device of example 1 or 2, further including: a temperature sensor to measure a temperature of the light source.

4. The device in any of the preceding examples 1 through 3, wherein the light source is a structured light source to emit light corresponding to a known pattern.

5. The device in any of the preceding examples 1 through 4, wherein the pattern is a speckle pattern corresponding to a reference image including a plurality of dots, each of the dots having known coordinates in the reference image.

6. The device in any of the preceding examples 1 through 5, wherein the polynomial model is used to compensate for shifts in the pattern for generating an accurate depth map.

7. The device in any of the preceding examples 1 through 6, where the polynomial model includes a first polynomial and a second polynomial, the first and second polynomials being functions of a plurality of variables, the variables including a temperature drift from a reference temperature and positional coordinates in the reference image.

8. The device of example 7, wherein the pattern includes a plurality of objects and the polynomial model includes the first and second polynomials to estimate shifts of the objects of the pattern due to the temperature drift.

9. The device of example 7 or 8, wherein each of the first and second polynomials includes a plurality of cubic terms to model interactions between the positional coordinates in the reference image and the temperature drift, each of the cubic terms including a product of multiplying three variables.

10. The device in any of the preceding examples 7 through 9, wherein each of the first and second polynomials is a weighted combination of terms depending on the temperature drift, a first positional coordinate in the reference image, or a second positional coordinate in the reference image; and wherein the processor trains weight coefficients of the first and second polynomials using a training data set, the training data set including values of the positional coordinates in the reference image, values of the temperature drifts, and corresponding known values of shifted positional coordinates in shifted images that correspond to shifts of the pattern due to the temperature drift.

11. The device in any of the preceding examples 1 through 10, wherein the pattern includes a plurality of objects; and wherein the polynomial model includes a plurality of function sets, each of the function sets is predictive of shifts of one of the objects of the pattern due to the temperature drift, each of the function sets including a function predictive of a shift along a first direction and another function predictive of a shift along a second direction.

12. The device of example 11, wherein each function of the function sets includes a plurality of quadratic terms to model interactions between the positional coordinates in the reference image and the temperature drift, each of the quadratic terms including a product of multiplying two variables.

13. The device of example 11 or 12, wherein each function of the function sets is a weighted combination of terms depending on the temperature drift, a first coordinate in the reference image, or a second coordinate in the reference image; and wherein weight coefficients of each function are trained based on a plurality of known shifts of the pattern due to the temperature drift.

14. The device in any of the preceding examples 11 through 13, wherein the plurality of function sets are predictive of shifts of a subset of sampling objects within the pattern; and wherein the polynomial model estimates a shift of a remaining object using one function set that corresponds to a sampling object within the subset, the sampling object in proximity to the remaining object in the reference image.

15. An apparatus for compensating for temperature shifts of a structured light pattern, including: means for emitting light corresponding to a known pattern by a structured light source of a depth imaging device, the known pattern including a plurality of objects that have shifts in the pattern due to a temperature drift of the structured light source; means for receiving the light reflected by an environment of the depth imaging device; means for generating, based on the light, a depth map including a plurality of pixel values corresponding to depths of objects in the environment relative to the depth imaging device; means for predicting the temperature shifts of the objects of the pattern based on a polynomial model; and means for adjusting the depth map based on the temperature shifts of the objects of the patterns.

16. The apparatus of example 15, further including: means for identifying a location of an object in the environment by using the depth map that has been adjusted.

17. The apparatus of example 15 or 16, further including: means for training the polynomial model by optimizing model parameters of the polynomial model using a training data set, the training data set including known shifts of the objects due to temperature drifts and corresponding temperature drifts from a reference temperature.

18. The apparatus in any of the preceding examples 15 through 17, wherein the polynomial model includes a first polynomial predictive of shifts in a first direction and a second polynomial predictive of shifts in a second direction, each of the first and second polynomials including a plurality of cubic terms, each of the cubic terms including a product of multiplying three variables that include a temperature drift from a reference temperature, a x coordinate in a reference image corresponding to the pattern, or a y coordinate in the reference image; and wherein the means for predicting includes: means for predicting the temperature shifts of the objects of the pattern by applying the first and second polynomials to each of the objects of the pattern.

19. The apparatus in any of the preceding examples 15 through 18, wherein the polynomial model includes a plurality of polynomial sets, each of the polynomial sets predictive of shifts of one of the objects of the pattern due to temperature drift, each of the polynomial sets including a polynomial to estimate a shift along a first direction and another polynomial to estimate a shift along a second direction; and wherein the means for predicting includes: means for predicting the temperature shifts of the objects of the pattern by applying each polynomial set of the plurality of polynomial sets to a corresponding object of the objects of the pattern.

20. A head-mounted display device including: a display that, when in operation, outputs an image to an eye of a user; a light source to emit light corresponding to a pattern including a plurality of features, wherein a temperature drift of the light source, an optical component of the head-mounted display device, or an environment of the head-mounted display device causes a shift of the pattern; an imaging sensor to receive the light reflected by the environment of the head-mounted display device and that, when in operation, generates a depth map including a plurality of pixel values corresponding to depths of the environment relative to the head-mounted display device; and a processor that, when in operation, estimates the shifts of the features of the pattern by using a polynomial model depending on the temperature drift of the light source and adjusts the depth map based on the shifts of the features.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A depth imaging device, comprising:
an imaging sensor configured to:
receive light reflected by an environment within a field of view of the depth imaging device; and
generate, based on the light, a depth map including a plurality of pixel values corresponding to depths of the environment relative to the depth imaging device;
a temperature sensor configured to measure a temperature drift corresponding to the light; and
a processor configured to:
estimate a shift of the light based on the temperature drift using one or more temperature compensation models; and
adjust the depth map based on the shift of the light.

2. The depth imaging device of claim 1, wherein the processor is further configured to:
estimate a shift of a pattern of the light based on the temperature drift; and
adjust the depth map further based on the shift of the pattern,
wherein the pattern is a speckle pattern corresponding to a reference image including a plurality of dots, each dot of the plurality of dots having known coordinates in the reference image.

3. The depth imaging device of claim 1, wherein the processor is further configured to:
estimate a shift of a pattern of the light based on the temperature drift; and
adjust the depth map further based on the shift of the pattern,
wherein the shift of the pattern is estimated by using a polynomial model depending on the temperature drift.

4. The depth imaging device of claim 3, wherein the polynomial model is used to compensate for shifts in the pattern for generating an accurate depth map.

5. The depth imaging device of claim 3, wherein the pattern is a light pattern corresponding to a reference image including a plurality of objects; and
wherein the polynomial model is used to estimate shifts of one or more objects of the plurality of objects due to the temperature drift.

6. The depth imaging device of claim 3, wherein the pattern is a light pattern corresponding to a reference image; and
wherein the polynomial model includes polynomials that are functions of a plurality of variables, wherein the plurality of variables include the temperature drift from a reference temperature and positional coordinates in the reference image.

7. The depth imaging device of claim 6, wherein the polynomial model includes one or more polynomials having a plurality of cubic terms to model interactions between the positional coordinates in the reference image and the temperature drift, each of the plurality of cubic terms including a product of multiplying three variables of the plurality of variables.

8. The depth imaging device of claim 6, wherein the polynomial model includes one or more polynomials having a weighted combination of terms depending on the temperature drift; and
wherein the processor is further configured to train weight coefficients of the one or more polynomials using a training data set, the training data set including values of the positional coordinates in the reference image, values of the plurality of variables of the one or more polynomials associated with the temperature drift, and corresponding known values of shifted positional coordinates in shifted images that correspond to shifts of the pattern due to the temperature drift.

9. The depth imaging device of claim 1, wherein the processor is further configured to:
estimate a shift of a pattern of the light based on the temperature drift; and
adjust the depth map further based on the shift of the pattern,
wherein the pattern is a light pattern corresponding to a reference image including a plurality of objects; and
wherein the shift of the pattern is estimated by using a polynomial model, wherein the polynomial model includes a function set, each function of the function set being predictive of shifts of a corresponding object of the plurality of objects due to the temperature drift, the function set including a first function predictive of a shift along a first direction and a second function predictive of a shift along a second direction.

10. The depth imaging device of claim 9, wherein each function of the function set includes a plurality of quadratic terms to model interactions between positional coordinates of the reference image and the temperature drift, each quadratic term of the plurality of quadratic terms including a product of multiplying two variables.

11. The depth imaging device of claim 9, wherein each function of the function set is a weighted combination of terms depending on the temperature drift, a first coordinate in the reference image, or a second coordinate in the reference image; and
wherein weight coefficients of each function are trained based on a plurality of known shifts of the pattern due to the temperature drift.

12. The depth imaging device of claim 9, wherein the function set is predictive of shifts of a subset of sampling objects of the plurality of objects; and
wherein the polynomial model estimates a shift of an object of the plurality of objects using one function set that corresponds to a sampling object within the subset, the sampling object in proximity to a remaining object in the reference image.

13. A method for compensating for temperature shift of a structured light pattern of a depth imaging system, the method comprising:
receiving light reflected by an environment within a field of view of the depth imaging system;
generating, based on the light, a depth map including a plurality of pixel values corresponding to depths of the environment relative to the depth imaging system;
determining, by a temperature sensor, a temperature drift corresponding to the light;
estimating a shift of the light based on the temperature drift using one or more temperature compensation models; and
adjusting the depth map based on the shift of the light.

14. The method of claim 13, further comprising:
estimating a shift of a pattern of the light based on the temperature drift; and
adjusting the depth map further based on the shift of the pattern,
wherein the pattern is a speckle pattern corresponding to a reference image including a plurality of dots, each dot of the plurality of dots having known coordinates in the reference image.

15. The method of claim 13, further comprising:
estimating a shift of a pattern of the light based on the temperature drift; and
adjusting the depth map further based on the shift of the pattern,
wherein the shift of the pattern is estimated by using a polynomial model depending on the temperature drift.

16. The method of claim 15, wherein the polynomial model is used to compensate for shifts in the pattern for generating an accurate depth map.

17. The method of claim 15, wherein the pattern is a light pattern corresponding to a reference image including a plurality of objects; and
wherein the polynomial model is used to estimate shifts of one or more objects of the plurality of objects due to the temperature drift.

18. The method of claim 15, wherein the pattern is a light pattern corresponding to a reference image; and
wherein the polynomial model includes polynomials that are functions of a plurality of variables, wherein the plurality of variables include the temperature drift from a reference temperature and positional coordinates in the reference image.

19. The method of claim 18, wherein the polynomial model includes one or more polynomials having a plurality of cubic terms to model interactions between the positional coordinates in the reference image and the temperature drift, each of the plurality of cubic terms including a product of multiplying three variables of the plurality of variables.

20. A head-mounted display device comprising:
an imaging sensor configured to:
receive light reflected by an environment within a field of view of the head-mounted display device; and
generate, based on the light, a depth map including a plurality of pixel values corresponding to depths of the environment relative to the head-mounted display device;
a temperature sensor configured to measure a temperature drift corresponding to the light; and
a processor configured to:
estimate a shift of the light based on the temperature drift using one or more temperature compensation models; and
adjust the depth map based on the shift of the light.

* * * * *